Oct. 11, 1927.
C. P. NELLIS ET AL
1,645,446
STEERING WHEEL
Filed March 11, 1925
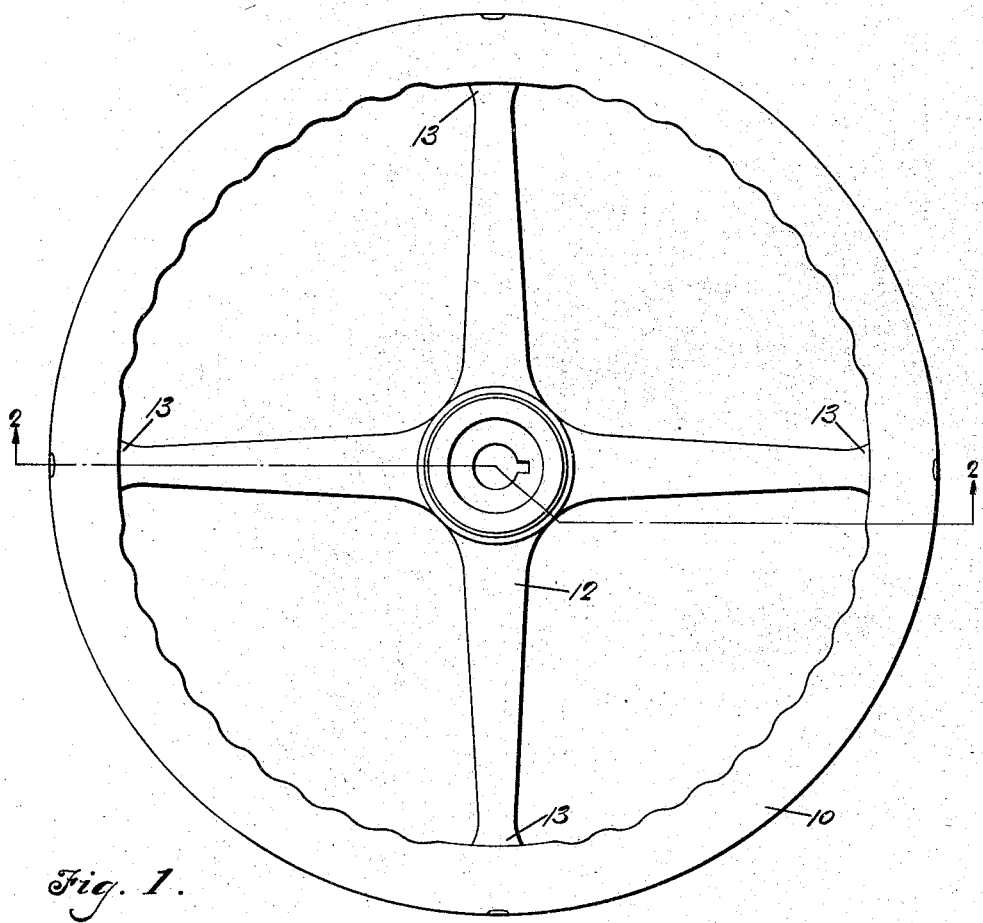
Fig. 1.
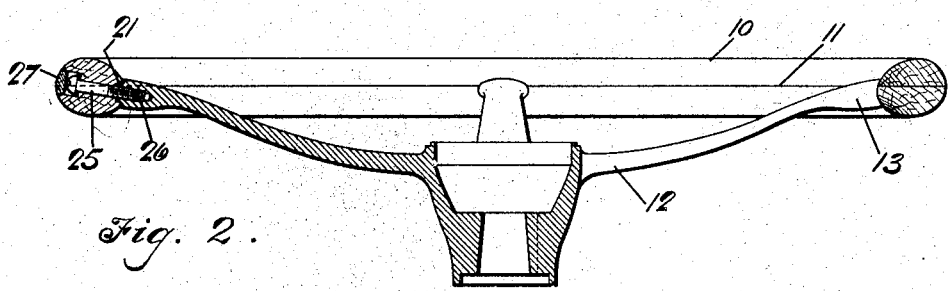
Fig. 2.
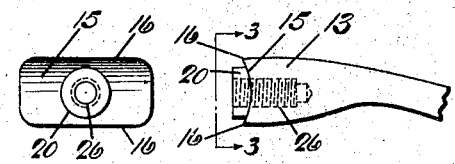
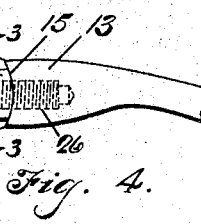
Fig. 3.    Fig. 4.
Inventor
Charles P. Nellis
Alva W. Scott
By Spencer Sewall Hardman
their    Attorney Patented Oct. 11, 1927.

1,645,446

UNITED STATES PATENT OFFICE.

CHARLES P. NELLIS AND ALVA W. SCOTT, OF DAYTON, OHIO, ASSIGNORS TO THE INLAND MANUFACTURING COMPANY, OF DAYTON, OHIO, A CORPORATION OF DELAWARE.

STEERING WHEEL.

Application filed March 11, 1925. Serial No. 14,660.

This invention relates to handwheels and has especial reference to such as are ordinarily used as steering wheels on automotive vehicles.

Heretofore various methods have been devised to secure a metal spider to a handwheel rim of wood or other non-metallic material. In Patent No. 1,299,048, issued April 1, 1919, there has been shown a metallic spider having the enlarged outer ends of the arms inserted bodily in corresponding recesses in the wooden rim and the inserted ends held in place by machine screws extending horizontally through the rim into the ends of the arms. Such a construction is of good appearance, however it is expensive to manufacture due to the shape and size of the recesses cut into the inner periphery of the rim. The rim itself is also weakened to quite an extent due to the relatively large recesses cut therein.

Now this invention has for an object to provide a handwheel having a metal spider having all the appearances of having its outer ends inserted bodily into the rim but which obviates the above mentioned defects of such bodily inserted spider arms.

Another object is to provide a simple, strong and economical method of attaching a metallic spider to a handwheel rim.

Further objects and advantages of the present invention will be apparent from the following description, reference being had to the accompanying drawing, wherein a preferred form of embodiment of the present invention is clearly shown.

In the drawing:

Fig. 1 is a plan view of an automobile steering wheel made according to this invention.

Fig. 2 is a section on line 2—2 of Fig. 1.

Fig. 3 is an end view of the outer end of one of the spider arms and is taken looking in the direction of arrows 3—3 of Fig. 4.

Fig. 4 is a side elevation of the outer end of one of the spider arms.

Referring to the drawings, 10 designates the handwheel rim which is illustrated as made of the ordinary wood segment construction being split in its central plane at 11 to stagger the scarf joints between the segments. The spider 12 is preferably of cast aluminum for the sake of good appearance but may be of other metal such as malleable iron. The outer ends 13 of the spider arms are preferably somewhat enlarged, as clearly shown in the drawings in plan and side elevation, in order to increase the area of the end surfaces 15 of the arms, which surfaces take the radial thrust against the rim. These end surfaces 15 are curved, as clearly shown in Figs. 3 and 4, to fit snugly against the curvature of the rim 10 where they abut said rim. Preferably the curvature of the end surfaces 15 is slightly sharper than the curvature of the rim at the abutting point in order to insure that the edges 16 of the end surfaces 15 will mash down into the rim a slight amount and thus give the appearance of the end of the spider arm being bodily inserted into the rim.

The outer ends 15 are preferably each provided with a short projecting boss 20 which projects radially outwardly from the central portion of end pad 15 (see Fig. 3). The inner periphery of the rim 10 is provided with corresponding round recesses 21 into which these bosses 20 are adapted to fit snugly.

In assembling the spider upon the rim, the spider is supported near the outer ends of the arms by suitable means and a plunger member depresses the spider hub to thus increase the dish of the spider and to cause the outer ends of the arms to move toward the spider axis a small distance sufficient to enable the rim to be placed over the ends of the spider arms with the recesses 21 in the rim lying directly opposite the bosses 20. The spider distorting means is then released, permitting the arms to spring outwardly and causing the bosses 20 to be pressed into the recesses 21 and the end surfaces 15 of the arms to bear tightly against the inner periphery of the rim.

The machine screws 25 are next inserted through holes through the rim provided therefor and screwed into the threaded recesses 26 concentric with the bosses 20. The arm ends are thus very rigidly and securely held against the rim 10. Preferably the heads of screws 25 lie within a counterbore in the rim and are concealed and prevented from loosening and working out by the wooden filler plugs 27, as clearly shown in Fig. 2.

It will be obvious from the drawings and above description that the rim 10 is not weakened any substantial amount by the relatively small recesses 21, and that the end surfaces 15 of the spider arms are pressed with such force against the inner periphery of the rim that the outer ends of the arms have all the appearance of being bodily inserted within the rim.

While the form of embodiment of the present invention as herein disclosed, constitutes a preferred form, it is to be understood that other forms might be adopted, all coming within the scope of the claims which follow.

What is claimed is as follows:

1. In a handwheel, in combination, a spider having metallic arms, a non-metallic rim of curved section suitable for grasping with the hands, the outer ends of said arms being curved to fit snugly up against the inner periphery of the rim where they abut said rim and to thereby give the appearance of being inserted bodily within the rim, a round boss projecting from each of said arm ends and inserted within corresponding recesses in the rim, and machine screws extending through the rim and threaded into said bosses to rigidly secure said arm ends to said rim.

2. In a handwheel, in combination, a spider having metallic arms, a non-metallic rim of curved section suitable for grasping with the hands, the outer ends of said arms being curved to fit snugly up against the inner periphery of the rim where they abut said rim and to thereby give the appearance of being inserted bodily within the rim, a relatively small round boss projecting from each of said arm ends and inserted within corresponding recesses in the rim, and machine screws extending through the rim and threaded into said bosses to rigidly secure said arm ends to said rim.

In testimony whereof we hereto affix our signatures.

CHARLES P. NELLIS.
ALVA W. SCOTT.